(12) United States Patent
Ning

(10) Patent No.: US 8,294,771 B2
(45) Date of Patent: Oct. 23, 2012

(54) IMAGE CORRECTION DEVICE AND IMAGE CORRECTION METHOD THEREOF

(75) Inventor: Wen-Min Ning, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 192 days.

(21) Appl. No.: 12/967,048

(22) Filed: Dec. 14, 2010

(65) Prior Publication Data
US 2011/0279686 A1    Nov. 17, 2011

(30) Foreign Application Priority Data

May 17, 2010    (TW) ............................... 99115632 A

(51) Int. Cl.
*H04N 17/00*    (2006.01)
(52) U.S. Cl. ..................................................... 348/188
(58) Field of Classification Search .................. 348/188, 348/180–182, 184, 187, 189, 175, 687, 678–679, 348/673, 650
See application file for complete search history.

(56) References Cited

U.S. PATENT DOCUMENTS

| | | | | |
|---|---|---|---|---|
| 4,837,711 A * | 6/1989 | Suzuki | ........................... | 358/1.1 |
| 5,883,982 A * | 3/1999 | Riley et al. | ..................... | 382/255 |
| 6,122,412 A * | 9/2000 | Noguchi et al. | .............. | 382/312 |
| 6,747,766 B1 * | 6/2004 | Kamisuwa et al. | ........... | 358/505 |
| 7,419,230 B2 * | 9/2008 | Tatsuta et al. | ..................... | 347/5 |
| 2012/0044369 A1 * | 2/2012 | Irisawa et al. | .............. | 348/208.4 |

* cited by examiner

*Primary Examiner* — Paulos Natnael
(74) *Attorney, Agent, or Firm* — Altis Law Group, Inc.

(57) ABSTRACT

An image correction device includes an image capturing module, a first calculating module, a second calculating module, a third calculating module, and a correction module. The image capturing module includes an image sensor having a center (Xo, Yo). The image capturing module takes an image of a test chart. A center of the group of black stripes is coincident with a center of the image. The first calculating module is for calculating coordinates of a center of each black stripe of the group of black stripes. The second calculating module is for calculating coordinates (Xc, Yc) of the center of the image. The third calculating module is for calculating a coordinate deviation ($\Delta X$, $\Delta Y$)=(Xc−Xo, Yc−Yo). The correction module is for inputting the coordinate deviation ($\Delta X$, $\Delta Y$) into the image sensor so that the image sensor corrects the image according to the coordinate deviation ($\Delta X$, $\Delta Y$).

10 Claims, 4 Drawing Sheets

IMAGE CORRECTION DEVICE AND IMAGE CORRECTION METHOD THEREOF

BACKGROUND

1. Technical Field

The present disclosure relates to an image correction device and an image correction method for the image correction device.

2. Description of Related Art

A typical camera module includes a lens module and an image sensor. The lens module and the image sensor may not be aligned accurately. A center of an image taken by the camera module may deviate from a center of the image sensor. The deviation may render the test (e.g., the test of resolution) of the camera module inaccurately. In addition, the deviation may deteriorate the imaging quality of the camera module.

Therefore, it is desirable to provide an image correction device and an image correction method, which can overcome the above-mentioned limitations.

DETAILED DESCRIPTION

Figure 1:
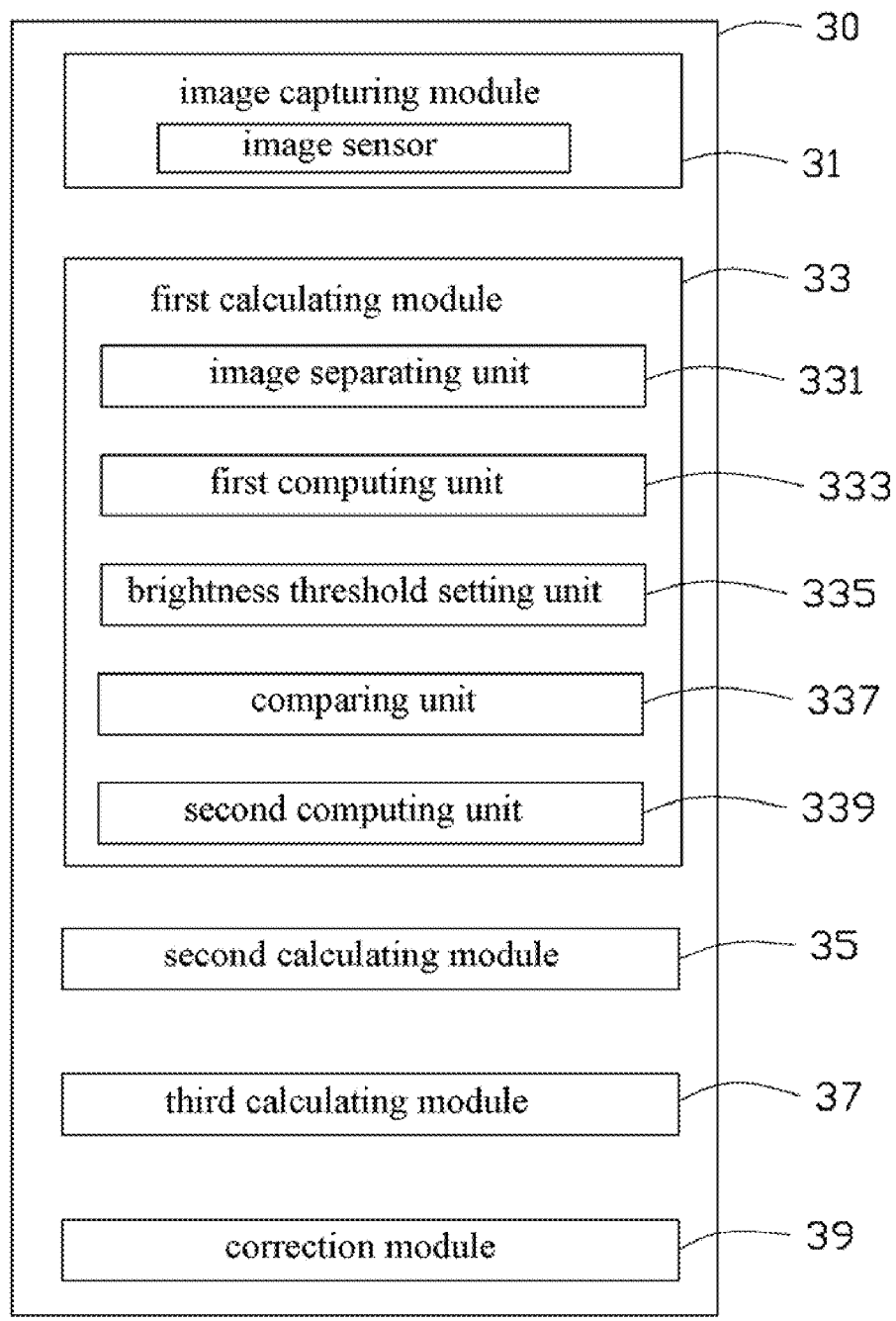
FIG. 1 is a block diagram of an image correction device according to an embodiment.

Referring to FIG. 1, an image correction device 30 according to an exemplary embodiment is shown. The image correction device 30 includes an image capturing module 31, a first calculating module 33, a second calculating module 35, and a third calculating module 37, and a correction module 39.

Figure 2:
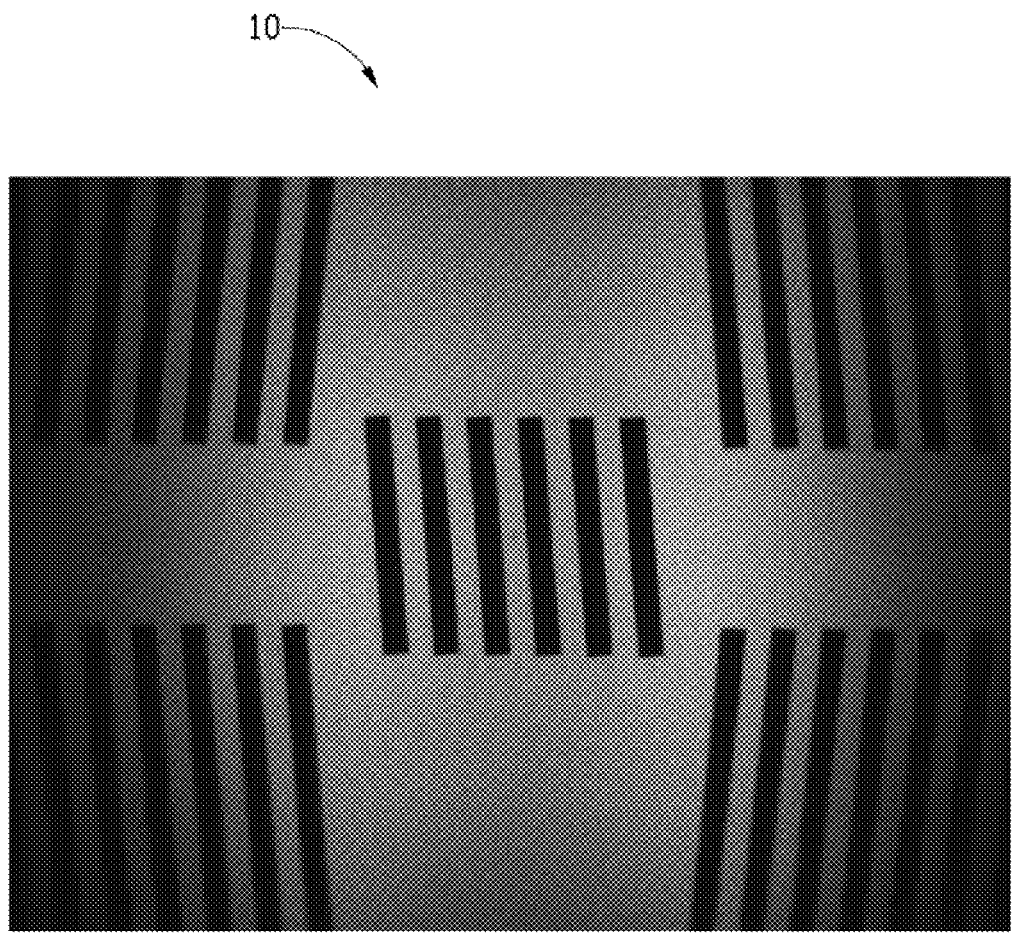
FIG. 2 is a plane view of a test chart according to one embodiment.
Figure 3:
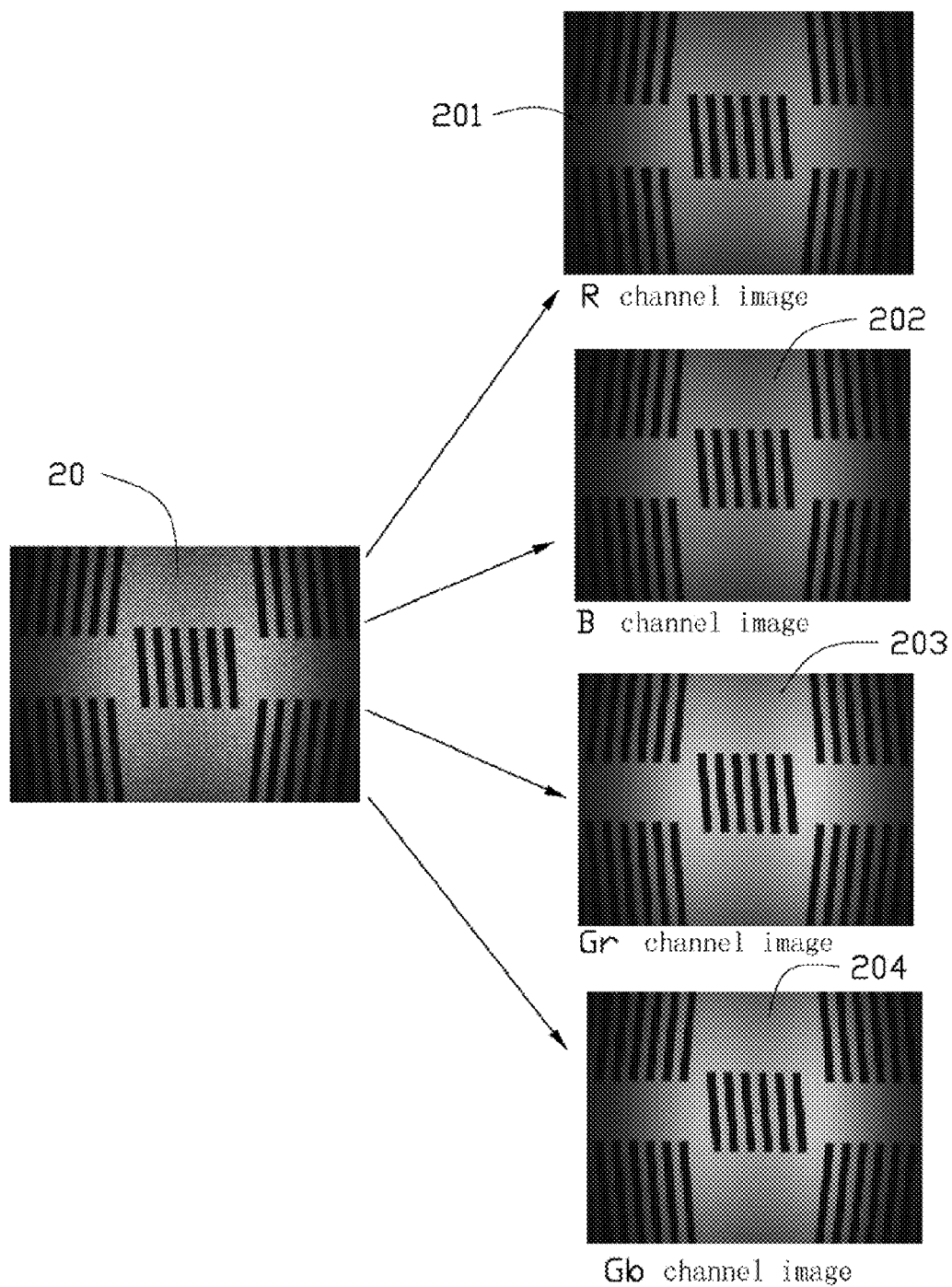
FIG. 3 shows an image of the test chart and four separated channel images, which are divided from the image according to different color channels.

The image capturing module 31 includes an image sensor 311 with a center. Coordinates of the center of the image sensor 311 are represented by (Xo, Yo). The image capturing module 31 is configured (i.e., structured and arranged) for taking an image 20 of a test chart 10, as seen in FIGS. 2-3. In the present embodiment, the image capturing module 31 is a video graphics array (VGA) camera module.

In the present embodiment, the test chart 10 is a substantially rectangular monochromatic picture. The test chart 10 includes one group of black stripes positioned in the middle thereof and four groups of black stripes respectively positioned in four corners. Each group of black stripes includes six equidistant parallel black stripes. Each black stripe is substantially a parallelogram. A center of the group of black stripes in the middle of the test chart 10 is coincident with the center of the test chart 10. In the present embodiment, the size of the image 20 is 640 by 480 (640×480) pixels. The image 20 at least includes the group of black stripes in the middle of the test chart 10, and the center of the group of black stripes is coincident with the center of the image 20. The center of the group of black stripes means a center of a geometric figure formed by the whole group of black stripes.

The first calculating module 33 is configured for calculating coordinates of a center of each black stripe of the group of black stripes in the middle of the image 20. The first calculating module 33 includes an image separating unit 331, a first computing unit 333, a brightness threshold setting unit 335, a comparing unit 337, and a second computing unit 339.

Referring to FIG. 3, the image separating unit 331 is configured for separating the image 20 according to different color channels, thus obtaining a Gr channel image 203. In the present embodiment, referring to FIG. 3, the image 20 is divided based on four different color channels, i.e., a red channel (R channel), a blue channel (B channel), a green-red channel (Gr channel), and a green-blue channel (Gb channel), thus obtaining an R channel image 201, a B channel image 202, a Gr channel image 203, and a Gb channel image 204. The size of each of the images 201-204 is 320 by 240 (320×240) pixels.

The first computing unit 333 is configured for computing a user-defined brightness of each pixel of the Gr channel image 203. The user-defined brightness of a particular pixel is calculated according to the following method: choosing a square pixel area of n by n (n×n) pixels, which is centered at the particular pixel, calculating a sum of an actual brightness of each pixel within the square pixel area, dividing the sum by the total number of pixels within the square pixel area (i.e., n×n). In the present embodiment, n is equal to 77. A boundary of the square pixel area may be parallel or unparallel to a long line of the Gr channel image 203.

The brightness threshold setting unit 335 is configured for setting a brightness threshold. The brightness threshold may be a user-defined brightness of a center of the Gr channel image 203. The user-defined brightness of the center of the Gr channel image 203 is calculated as follows: choosing a rectangular pixel area of m by n pixels in the center of the Gr channel image 203, calculating a sum of an actual brightness of each pixel within the rectangular pixel area, and dividing the sum by the total number of pixels within the rectangular pixel area (i.e., m×n). In the present embodiment, m is equal to 8, and n is equal to 4. In other embodiments, m may be equal to n.

The comparing unit 337 is configured for comparing a user-defined brightness of each pixel with the brightness threshold, and determining whether a pixel belongs to a black stripe based on the comparing result. If the user-defined brightness of a pixel is less than the brightness threshold, the comparing unit 337 determines that the pixel is positioned in a black stripe.

The second computing unit 339 is for computing coordinates of a center of each black stripe of the group of black stripes in the middle of the Gr channel image 203 according to coordinates of pixels positioned in each black stripe.

A method for calculating the coordinates of the center of a black stripe will be described with an example as follows. First, coordinates of four vertices of the black stripe (i.e., a top left vertex, a top right vertex, a bottom left vertex, and a bottom right vertex) are respectively supposed to be (1, 1), (3, 1), (0, 2), and (2, 2). Then, an X-coordinate of the center of the black stripe is calculated using the following equation: (0+3)/2=1.5, and a Y-coordinate of the center of the black stripe is calculated according to the equation: (1+2)/2=1.5. Accordingly, the coordinates of the center of the black stripe is (1.5, 1.5).

The second calculating module 35 is for calculating coordinates (Xc, Yc) of the center of the image 20 based on coordinates of centers of black stripes of the group of black stripes in the middle of the image 20. In the present embodiment, the coordinates of the centers of six black stripes of the group of black stripes in the middle of the image 20 are respectively represented by (X1, Y1), (X2, Y2), (X3, Y3), (X4, Y4), (X5, Y5), and (X6, Y6). An X-coordinate of the image 20 is calculated according to the equation Xc=(X1+ X2+X3+X4+X5+X6)/6, while a Y-coordinate of the image 20 is calculated based on the equation Yc=(Y1+Y2+Y3+Y4+ Y5+Y6)/6.

The third calculating module 37 is configured for calculating a coordinate deviation ($\Delta X$, $\Delta Y$)=(Xc−Xo, Yc−Yo) between the center of the image 20 and the center of the image sensor 311.

The correction module 39 is for inputting the coordinate deviation ($\Delta X$, $\Delta Y$) into the image sensor 311 via an inter-integrated circuit (I2C). The image sensor 311 corrects images according to the coordinate deviation ($\Delta X$, $\Delta Y$).

Figure 4:
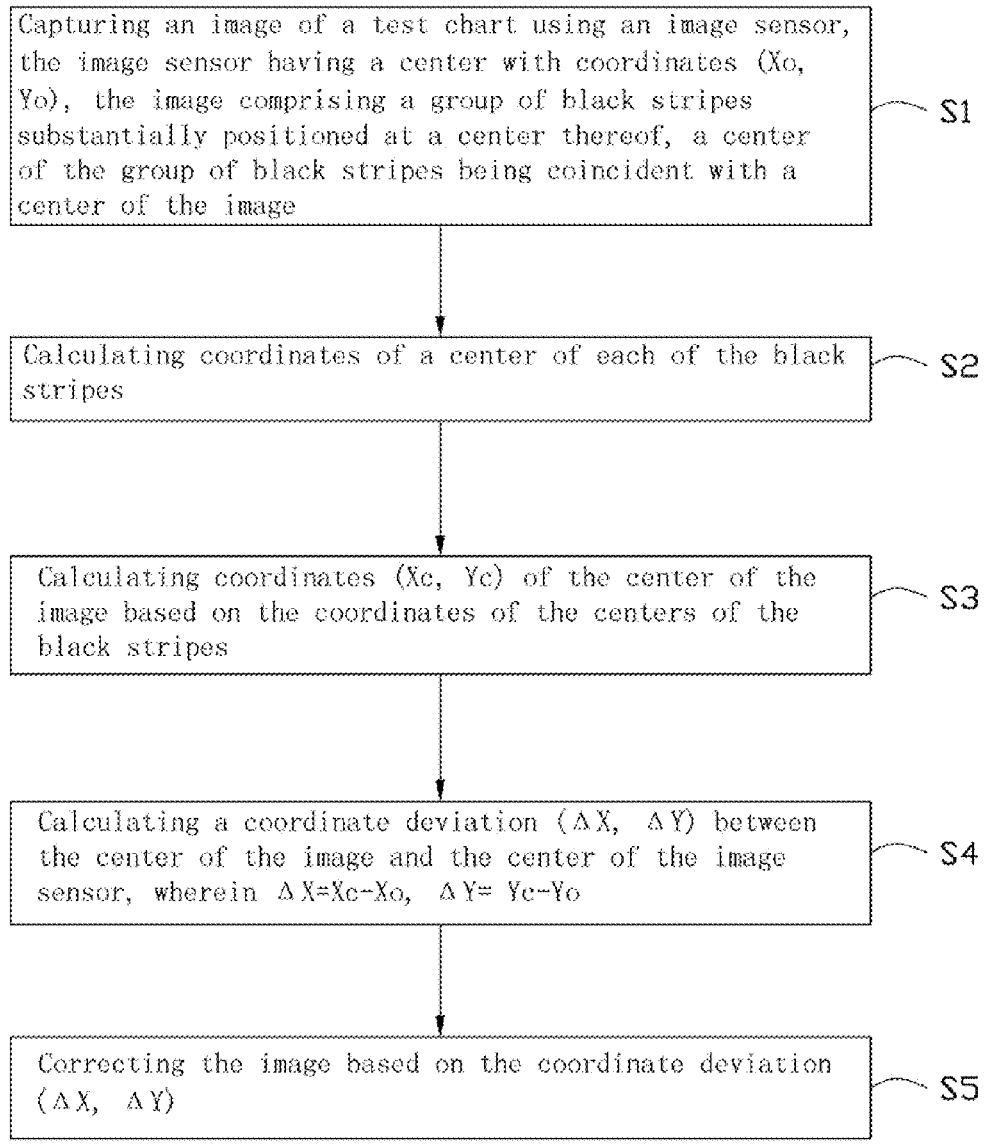
FIG. 4 is a flow chart of an image correction method according to an embodiment.

Referring to FIG. 4, a method for correcting images using the image correction device 30 according to one embodiment will be described as follows.

In step S1, the image 20 of the test chart 10 is taken using the image capturing module 31. The image 20 at least includes the group of black stripes in the middle of the test chart 10, and the center of the group of black stripes is coincident with the center of the image 20.

In step S2, coordinates of a center of each black stripe of the group of black stripes in the middle of the image 20 are calculated.

In step S3, coordinates (Xc, Yc) of the center of the image 20 are calculated based on coordinates of centers of black stripes of the group of black stripes in the middle of the image 20.

In the present embodiment, the coordinates of the centers of six black stripes of the group of black stripes in the middle of the image 20 are respectively represented by (X1,Y1), (X2, Y2), (X3, Y3), (X4, Y4), (X5, Y5), and (X6, Y6). An X-coordinate of the image 20 is calculated according to the equation Xc=(X1+X2+X3+X4+X5+X6)/6, while a Y-coordinate of the image 20 is calculated based on the equation Yc=(Y1+ Y2+Y3+Y4+Y5+Y6)/6.

In step S4, a coordinate deviation ($\Delta X$, $\Delta Y$)=(Xc−Xo, Yc−Yo) between the center of the image 20 and the center of the image sensor 311 is calculated.

In step S5, the coordinate deviation ($\Delta X$, $\Delta Y$) is input into the image sensor 311 via an inter-integrated circuit (I2C), and then the image 20 is corrected according to the coordinate deviation ($\Delta X$, $\Delta Y$).

Sub-steps of the step S2 will be described as follows.

In step S21, referring to FIG. 3, the image 20 is separated according to different color channels, thus obtaining a Gr channel image 203.

In step S22, a user-defined brightness of each pixel of the Gr channel image 203 is calculated.

In step S23, a brightness threshold is set.

In step S24, a user-defined brightness of each pixel is compared with the brightness threshold, and it is determined whether a pixel belongs to a black stripe based on the comparing result. If the user-defined brightness of a pixel is less than the brightness threshold, the comparing unit 337 determines that the pixel is positioned in a black stripe.

In step S25, coordinates of a center of each black stripe of the group of black stripes in the middle of the Gr channel image 203 are calculated according to coordinates of pixels positioned in each black stripe.

In the present embodiment, the step S2 is conducted using the Gr channel image 203 because the Gr channel image 203 has the highest contrast of the four channel images. In alternative embodiments, the step S2 may be conducted based on other channel images, e.g., the R channel image.

While various embodiments have been described, it is to be understood that the disclosure is not limited thereto. To the contrary, various modifications and similar arrangements (as would be apparent to those skilled in the art), are also intended to be covered. Therefore, the scope of the appended claims should be accorded the broadest interpretation so as to encompass all such modifications and similar arrangements.

What is claimed is:

1. An image correction device, comprising:
an image capturing module comprising an image sensor, the image capturing module being configured for capturing an image of a test chart, the image sensor having a center with coordinates (Xo, Yo), the image comprising a group of black stripes substantially positioned at a center thereof, a center of the group of black stripes being coincident with a center of the image;
a first calculating module for calculating coordinates of a center of each black stripe of the group of black stripes;
a second calculating module for calculating coordinates (Xc,Yc) of the center of the image based on coordinates of the centers of the black stripes;
a third calculating module for calculating a coordinate deviation ($\Delta X$, $\Delta Y$) between the center of the image and the center of the image sensor, wherein $\Delta X$=Xc−Xo, $\Delta Y$=Yc−Yo; and
a correction module for inputting the coordinate deviation ($\Delta X$, $\Delta Y$) into the image sensor so that the image sensor corrects the image according to the coordinate deviation ($\Delta X$, $\Delta Y$).

2. The image correction device of claim 1, wherein the first calculating module comprises:
an image separating unit configured for separating the image according to different color channels, thus obtaining a channel image;
a first computing unit for computing a user-defined brightness of each pixel of the channel image;
a brightness threshold setting unit for setting a brightness threshold;
a comparing unit for comparing the user-defined brightness of each pixel with the brightness threshold so as to determine pixels of the black stripes based on the comparing result; and
a second computing unit for computing coordinates of the center of each black stripe according to the coordinates of the pixels of each black stripe.

3. The image correction device of claim 2, wherein the image separating unit is configured for separating the image into at least one of a red channel image, a blue channel image, a green-red channel image, and a green-blue channel image.

4. The image correction device of claim 2, wherein the threshold is a user-defined brightness of a center of the channel image.

5. An image correction method comprising:
capturing an image of a test chart using an image sensor, the image sensor having a center with coordinates (Xo, Yo), the image comprising a group of black stripes substantially positioned at a center thereof, a center of the group of black stripes being coincident with a center of the image;
calculating coordinates of a center of each of the black stripes;
calculating coordinates (Xc,Yc) of the center of the image based on the coordinates of the centers of the black stripes;
calculating a coordinate deviation ($\Delta X$, $\Delta Y$) between the center of the image and the center of the image sensor, wherein $\Delta X$=Xc−Xo, $\Delta Y$=Yc−Yo; and
correcting the image based on the coordinate deviation ($\Delta X$, $\Delta Y$).

6. The method of claim 5, wherein the step of calculating the coordinates of the center of each of the black stripes comprises:
- separating the image according to different color channels, thus obtaining a channel image;
- computing a user-defined brightness of each pixel of the channel image;
- setting a brightness threshold;
- comparing the user-defined brightness of each pixel with the brightness threshold so as to determine pixels of each black stripe based on the comparing result; and
- computing coordinates of a center of each black stripe according to the coordinates of the pixels of each black stripe.

7. The method of claim 6, wherein the image is separated into at least one of a red channel image, a blue channel image, a green-red channel image, and a green-blue channel image.

8. The method of claim 6, wherein the step of computing a user-defined brightness of a given pixel of the channel image comprises:
- choosing a square pixel area of n by n pixels, the square pixel area centered at the given pixel;
- calculating a sum of an actual brightness of pixels within the square pixel area; and
- dividing the sum by the total number of pixels within the square pixel area, thus obtaining the user-defined brightness of the given pixel.

9. The method of claim 6, wherein the threshold is a user-defined brightness of a center of the channel image.

10. The method of claim 9, wherein the brightness threshold is calculated using a process including:
- choosing a rectangular pixel area in the center of the channel image;
- calculating a sum of an actual brightness of pixels within the rectangular pixel area; and
- dividing the sum by the total number of pixels within the rectangular pixel area, thus obtaining the user-defined brightness of the center of the channel image.

* * * * *